(12) United States Patent
Le Guen et al.

(10) Patent No.: US 10,508,413 B2
(45) Date of Patent: Dec. 17, 2019

(54) SYSTEM FOR SAMPLING SEDIMENT ON A BOTTOM OF A LIQUID MEDIUM

(71) Applicant: Environnemental Sediments Treatment, Saint-Avé (FR)

(72) Inventors: Guylène Le Guen, Ploemeur (FR); Philippe Petard, Nantes (FR)

( * ) Notice: Subject to any disclaimer, the term of this patent is extended or adjusted under 35 U.S.C. 154(b) by 94 days.

(21) Appl. No.: 15/537,048

(22) PCT Filed: Dec. 18, 2015

(86) PCT No.: PCT/EP2015/080673
§ 371 (c)(1),
(2) Date: Jun. 16, 2017

(87) PCT Pub. No.: WO2016/097380
PCT Pub. Date: Jun. 23, 2016

(65) Prior Publication Data
US 2018/0002890 A1   Jan. 4, 2018

(30) Foreign Application Priority Data

Dec. 18, 2014  (FR) ..................... 14 62822
Dec. 18, 2014  (FR) ..................... 14 62824

(51) Int. Cl.
| | | |
|---|---|---|
| *E02F 3/92* | (2006.01) |
| *E02F 3/88* | (2006.01) |
| *B01D 11/02* | (2006.01) |
| *C02F 1/26* | (2006.01) |
| *A62D 3/00* | (2006.01) |

(52) U.S. Cl.
CPC ............ *E02F 3/9243* (2013.01); *B01D 11/02* (2013.01); *C02F 1/26* (2013.01); *E02F 3/8866* (2013.01); *E02F 3/9256* (2013.01); *A62D 3/00* (2013.01)

(58) Field of Classification Search
CPC ..... E02F 3/9243; E02F 3/8866; E02F 3/9256; B01D 11/02; A62D 3/00; C02F 1/26
See application file for complete search history.

(56) References Cited

U.S. PATENT DOCUMENTS 2,023,686 A * 12/1935 Kertzman ............ E02F 3/9243
                                                        299/8
3,103,790 A *  9/1963 Popich ................. E02F 3/9231
                                                        405/162

(Continued)

FOREIGN PATENT DOCUMENTS

| EP | 2090699 A2 | 8/2009 |
| FR | 2330811 A1 | 6/1977 |

(Continued)

*Primary Examiner* — Jamie L McGowan
(74) *Attorney, Agent, or Firm* — Benoit-Côté Inc.

(57) ABSTRACT

System for removing sediments from a bed of a liquid environment such as a harbor or a pond, characterized in that it comprises a conduit (30), the lower extremity of which forms a moving suction mouth (31) that is to be placed substantially at the level of the bed, and the upper extremity of which leads into the open air so that said mouth (31) is under atmospheric pressure, said system comprising means for carrying out a local stirring operation (41, 42, 43, 44, 53) within said mouth and discharging means (50, 51, 52) connecting said mouth (31) to the surface of said liquid environment, in which these sediments circulate.

14 Claims, 12 Drawing Sheets

(56) References Cited

U.S. PATENT DOCUMENTS

| | | | | |
|---|---|---|---|---|
| 3,620,572 A * | 11/1971 | Krutein | ............... | E02F 3/88 299/8 |
| 3,659,712 A * | 5/1972 | Chaplin | ............... | E02F 3/8858 210/104 |
| 3,753,303 A * | 8/1973 | Holzenberger | ............... | E02F 3/88 37/309 |
| 3,807,560 A * | 4/1974 | Pentz | ............... | B01D 21/04 210/740 |
| 4,030,216 A * | 6/1977 | Willums | ............... | E02F 7/04 299/8 |
| 4,073,080 A * | 2/1978 | Willums | ............... | E02F 3/88 37/195 |
| 4,083,134 A | 4/1978 | Oterdoom | | |
| 4,322,897 A * | 4/1982 | Brassfield | ............... | E02F 3/9243 37/322 |
| 4,353,174 A * | 10/1982 | Maloblocki | ............... | E02F 3/90 37/308 |
| 4,760,656 A * | 8/1988 | East | ............... | E02F 3/88 251/315.14 |
| 4,936,031 A * | 6/1990 | Briggs | ............... | E02F 3/925 37/189 |
| 4,957,622 A * | 9/1990 | Mims | ............... | B01D 21/245 210/170.04 |
| 7,754,073 B2 * | 7/2010 | Nielsen | ............... | B01D 21/0027 210/170.04 |
| 7,950,463 B2 * | 5/2011 | Fossli | ............... | E21B 7/12 166/358 |
| 2010/0083542 A1* | 4/2010 | Powers | ............... | E02F 3/8866 37/324 |
| 2012/0085003 A1* | 4/2012 | Goodin | ............... | E02F 3/9243 37/317 |
| 2014/0190044 A1* | 7/2014 | Wezemer | ............... | E02F 3/8875 37/333 |
| 2015/0211368 A1* | 7/2015 | Kalwa | ............... | B63G 8/001 37/309 |

FOREIGN PATENT DOCUMENTS

| | | |
|---|---|---|
| WO | 2012158028 A1 | 11/2012 |
| WO | 2013050136 A1 | 4/2013 |

* cited by examiner

SYSTEM FOR SAMPLING SEDIMENT ON A BOTTOM OF A LIQUID MEDIUM

1. FIELD OF THE INVENTION

The invention relates to the field of the cleansing of the bottoms or beds of liquid environments, for example bottoms or beds of seas or rivers.

The present invention can be applied especially in the processing and recycling of sediments that get naturally deposited and/or result from pollution on the beds of liquid environments such as estuaries, harbors, lakes, ponds, rivers, streams or water impoundment structures and purification stations.

2. PRIOR ART

Waterways carry numerous sediments. The depositing of these sediments naturally prompts the silting of the beds. This phenomenon can be amplified by the process of erosion, low flow-rates, and flat topography as well as industrial and urban wastes. Enclosed environments (marshes, ponds etc.) or nearly enclosed environments (harbors, dams etc.) are even more liable to undergo this problem.

This is why the beds or bottoms of these environments need to be cleaned out (this is called dredging). Classically, at periodic intervals (for example every three to five years) dredging operations are carried out in these area in order to remove the sludge or sediments that accumulate therein and that can ultimately disturb human activity (social activity, business activity, tourism, leisure activities etc.) and/or disturb the ecological balance.

These de-silting works are generally carried out by specialized boats known as dredgers, which may be hydraulic or mechanical dredgers, or by public works machines working from the banks.

The equipment used in hydraulic dredgers often combines, on the one hand, a mechanical or hydraulic system used to put the sediments collected on the bed into motion and, on the other hand, a system enabling the extraction of the stirred sediments, generally a suction pump.

One major drawback of these prior art systems is their harmful impact on the aquatic environment. Indeed, the sediments are stirred and lifted and part of them often gets distributed in the liquid space, resulting in a soiled and a cloudy appearance, and then get re-deposited on the water bed.

In addition, this stirring acts in depth and can reach areas polluted by toxic substances, heavy metals or pesticides coming from industry or from urban waste water. These toxic substances are generally trapped in layers of sludge during the depositing of the sediments on the beds of water environments. However, most hydraulic or mechanical dredging systems re-mobilize the polluted sediments from the cleansed area, causing hitherto buried toxic substances to be become uncovered. This toxic sludge then come into contact with the aquatic environment.

Besides, another drawback of existing solutions is the major, heterogeneous costs generated by temporary dredging work sites. Indeed, these work sites mobilize a large number of human and material resources for considerable periods that can go up to several months owing to the large quantities of sludge to be extracted.

In addition, during the dredging period, the harbor (for example) is inaccessible or is its access is greatly disturbed as compared with times of normal use.

Such dredging operations must in addition be regularly repeated (for example every five years) since silting is continual, and this may periodically disturb the activities of the area concerned.

One solution has been proposed by the document EP2090699 in which an underwater bell is placed on a bed to be cleansed. This bell contains a suction pump for the suction of the sludge. This bell is connected to a boat via a well enabling a diver to go down, and a tube. Through this tube, air under atmospheric pressure is pumped into the bell enabling the water and sediments to be pushed out of the bell. This water and sediments are sucked in by the suction pump towards a storage place in the boat. This reduces turbulence and stirring of sludge.

Although this device reduces the environmental impact of the dredging, it remains massive, fixed or not easy to move, and therefore very costly. Besides, a vessel has to be present above the bell.

Besides, following their extraction (and independently of the way in which its extraction is done), the sediments have to be removed and preferably partly reutilized and recycled. These sediments are generally transported and then undergo pre-processing prior to their use. This pre-processing is aimed firstly at separating the particles of sludge from the undesirable elements (detritus etc.) recovered during the dredging operation and drying the sediments by dissociating the dry matter from water. There are various types of pre-processing operations, the most classic ones being screening (i.e. passing sediments through a screen), sieving (i.e. passing the sediments through a sieve) or draining (i.e. the natural drainage of sediments by migration of excess water).

At present, there is no efficient system to process large quantities of sediments. Hence, thousands of cubic meters of sediments recovered during dredging operations are generally not processed. The wastes are thus stored on land in deposits or conveyed by pipelines, barges or other means of transportation far from the coasts and released in the high seas. These operations can also be environmentally harmful by contributing to the pollution of water because of the toxic material contained in such wastes.

Many studies however have shown the potential for recycling dredging sediments, for example in the manufacture of concrete for road works (for embankments, roads etc.), in industry (in glassworks, smelting) or again in agronomy.

There is therefore a need for a system that would enable the removal of sediments that respects environmental concerns and is easy to implement and then provides for efficient drying of the sediments while, at the same time, enabling the processing of greater quantities of incoming material, and contributing to the reduction of mass of wastes stored on land and shed into the sea.

3. SUMMARY OF THE INVENTION

The present invention is aimed at overcoming at least some of these drawbacks of the prior art.

This goal as well as others that shall appear more clearly here below are achieved according to at least one aspect of the invention by means of a system for removing sediments from a bed of a liquid environment such as a harbor or a pond. The system comprises, especially, a conduit, the lower extremity of which forms a moving suction mouth that is to be placed substantially at the level of the bed, and the upper extremity of which leads into the open air so that the mouth is under atmospheric pressure, the system comprising means for carrying out a local stirring operation within the mouth and discharging means connecting the mouth to the surface of the liquid environment, in which these sediments circulate.

Such a removal system makes it possible to take off small quantities of sediments from a silted floor in order to extract them, while reducing the environmental impact on the aquatic environment. In particular, the means for carrying out local stirring make it possible to detach the sediments from the bed. Such stirring can be achieved by mechanical means (for example through stirring arms) or again by means for generating excess pressure (for example by using jets of fluid). The fact that the conduit is under natural atmospheric pressure enables the creation of a local depression at its slower extremity, the role of which is to contain the "soiled" mixture of water and potentially polluted sediments within the cleansing zone defined by the conduit lying on the bed without this mixture being put into contact with the external aquatic environment as is often the case in present-day dredging solutions.

According to a first embodiment, the removal system comprises a floating unit supporting means for discharging through a first extremity.

Thus, one extremity of the conduit is kept out of water in order to enable the discharging of the mixture of water and sediments, using discharging means, towards adjoining barges or to operations for subsequent processing.

According to another embodiment, or as a complement, the systems for removing sendiments comprises a unit mobile on the bed, connected to means of discharging through a second extremity.

This unit mobile on the bed enables the cleansing of the silted areas that are difficult to access (such as zones under boats or pontoons for example) while leaving navigable routes free and keeping the second extremity of the conduit close to the bed in order to carry out the extraction of the sediments detached by the discharging means.

According to another particular aspect, the means for carrying out local stirring deliver at least one water jet under pressure directed towards the bed.

Thus, the pressure generated by the water jet or jets on the silted floor, often hardened on the surface, also makes it possible to detach and stir the sediments.

According to another particular aspect, the means for carrying out local stirring comprise at least one mechanical stirring device.

These mechanical means make it possible to work the silted floor, detach the sediments and mix them efficiently.

These means may for example be one or more fans driven rotationally along a vertical axis, or tools mounted on a horizontal axis (for example similarly to a scarifier).

According to another particular aspect, the conduit under atmospheric pressure carries and/or forms the discharging means.

Such a conduit makes it possible at the same time to protect and contain the discharging means and to define a cleansing perimeter on the floor. Since the conduit is under atmospheric pressure, a local depression is created within the cleansing perimeter when the level of mixture of water and sediment falls, as and when it is discharged by the discharging means. This local depression prevents any contact between the soiled liquid and the aquatic environment external to the conduit.

When the medium to be processed is shallow, this vertical conduit can extend as one piece between the surface and the bed. In other situations, the mouth can be connected to this conduit and more generally to the surface by a flexible tube.

According to another particular aspect, the removal means comprise means for checking on the proximity of the submerged height of the vertical conduit.

The position of the conduit can thus be adjusted so that the submerged lower extremity of the conduit lies on the floor to be cleansed.

According to another particular aspect, the control means are motor-driven.

This enables an automatic adjustment of the position of the conduit relative to the bed without any manual action being needed.

According to another particular aspect, the floating unit and/or unit mobile on the bed is equipped with means of autonomous movement.

According to another particular aspect, the system comprises autonomous means to control its movement so as to gradually cover a pre-defined surface.

In particular, the means of movement comprise at least one guide cable, the control means driving at least one element that is mobile along the cable or cables.

Thus, the robotization of the removal system avoids the need for any human action to control its movement. This reduces the requirements in terms of the human resources and financial resources, and facilitates and accelerates the cleansing operations. The use of secured guide cables at sea and/or on land is a simple and efficient means of moving the system.

According to another particular aspect, the system is connected to at least one unit for receiving the sediments removed.

The sediments taken can thus easily be retrieved and then if necessary be processed or recycled following their extraction.

The invention also relates to a method for removing sediments from a bed of a liquid environment such as a harbor or a pond. Such a method comprise at least iteration of the following steps:

placing a mobile suction mouth under atmospheric pressure, appreciably at the level of the bed;

carrying out local stirring inside the mouth; and discharging sediments from the mouth to the surface of the liquid environment.

According to one particular aspect, the steps are reiterated, and the steps of successive placing are controlled by a step for locating the position of the mouth.

According to another particular aspect, the step for locating the position takes account of a pre-determined processing plan defining a surface to be gradually processed.

Thus, each sequencing of steps constitutes an automated cycle enabling the cleansing to be done easily and gradually without external resources.

According to another aspect which in certain cases can be implemented independently of the above, the invention also relates to a device for the pre-processing of sediments taken from a bed of a liquid environment, comprising at least two successive sieving stages, each of the sieving stages comprising a sieve basket having meshes of pre-determined size, capable of being driven in rotation within a container so as to separate filtrates passing through said meshes of said basket from the residues that did not pass through said meshes.

According to another aspect of the invention, at least one of the sieving stages comprises means for projecting a fluid under pressure on at least one part of the periphery of the sieve basket, from the exterior to its interior, and the sieve basket has a truncatedly conical shape with an upper edge that is wider than the lower edge.

The projection of fluid under pressure on the periphery of the basket de-clogs the meshes of the basket forming the filter. The pressure exerted by the fluid detaches the particles obstructing the filter and puts them back into motion so that the sieving operation can be continued and so that the filtrates can be discharged.

The filtration and therefore the sorting and drying of the sediments is thus more efficient. The presence of the cleansing system ensures continuity in the working of the pre-processing device and thus ensures the processing of greater quantities of sediments.

The specific shape of the basket enables the residual sediment to be ejected out of the basket when it rotates, when the speed of the basket is increased.

According to one first embodiment, the projecting means comprise a plurality of nozzles distributed on the height of the periphery.

Thus, when the basket is put into movement and makes its rotation, the entire external surface of the basket, namely the lower extremity of the basket up to its higher extremity, is sprayed. This ensures that all the meshes of the basket are de-clogged and ensures maximum efficiency.

According another embodiment, the basket is flared in the vicinity of its upper edge.

This specific shape again facilitates the ejection of residual sediments out of the basket when the rotation speed of the basket is increased.

According to one particular embodiment, the basket is mounted on a rotation shaft that passes through it, and is mobile relative to the container.

In particular, the upper extremity of the rotation shaft is driven by a motor.

The starting up of the motor drives the rotation of the shaft and therefore that of the basket within the container. The technique implemented is simple and low cost.

According another embodiment, the container has an inclined bottom guiding the filtrates towards the transfer means.

In particular, the transfer means for transferring the filtrates comprise an overflow nozzle tip.

Thus, the filtrates that have passed through the meshes of the basket flow naturally towards the bottom of the container, while the overflow nozzle tip enables them to be guided precisely towards the following filtering basket.

According to another embodiment, the container is fixed inside a vessel receiving the residues.

Thus, the residues that have not crossed the meshes of the basket are recovered simply, within the device itself.

According to another embodiment, the vessel has a funnel shape beneath the container guiding the residues towards the discharging means.

This enables the residues to be guided naturally towards the bottom of the vessel and to be brought together in order to be discharged towards a storage tank for example.

According to another embodiment, the device for the pre-processing of the sediments comprises controlled means driving the rotation and/or speed of rotation of said baskets and/or the distribution of said fluid under pressure.

Thus, the cycle for processing sediments can be completely automated in order to gain in performance.

According to another embodiment, the pre-processing device for pre-processing sediments comprises three successive sieving stages.

The incoming sediments thus undergo three successive processing operations, the size of the meshes of the sieving baskets getting smaller as and when the sieving stages progress. In this way, three types of residues can be recovered and recycled: the "ultimate" residues taking the form of very fine particles. In addition, the "ultimate" filtrates discharged at the end of the operations are liquid and can be discharged directly into the original environment. The device is thus efficient since there remains no "ultimate" waste product to be stored.

Besides, the pre-processing operations can be performed "on site" on the very place of extraction of the sediments, unlike prior art solutions which require transportation of the sediments towards a processing zone. This considerably reduces the carbon balance of the transportation operations since only sediments rid off their water (and possibly packaged) are transported.

The invention also relates to a stage of pre-processing for a device for the sieving of sediments taken from a bed of a liquid environment, comprising a sieve basket having pre-determined mesh sizes, capable of being rotationally driven inside a container so as to separate filtrates passing through the meshes of the basket and residues that do not pass through the meshes, the device comprising means for projecting a fluid under pressure on at least a portion of the periphery of the sieve basket, from the exterior towards the interior.

Advantageously, the sieving basket has a truncatedly conical shape with an upper edge wider than the lower edge.

The invention also relates to a method for the pre-processing of sediments taken from a bed of a liquid environment, comprising at least two sieving phases.

Advantageously, each of the sieving phases implements the operations of:
 putting into rotation a truncatedly conical sieving basket having meshes of pre-determined size, within a container, so as to separate the filtrates passing through the meshes of the basket and the residues that do not pass through the meshes;
 projecting a fluid under pressure on the periphery of the sieving basket from the exterior towards the interior of this basket.

Such a method enables a simple and efficient sorting and drying of the sediments.

It can especially comprise the following steps for a processing cycle of one of said stages:
 extracting filtrates by putting said basket into rotation at a first rotating speed;
 discharging the residues by putting said basket into rotation at a second rotation speed greater than the first speed;
 de-clogging the basket by putting said basket into rotation at a third speed lower than said second speed and activating the projection of fluid.

4. LIST OF FIGURES

Other features and advantages of the invention shall appear more clearly from the following description of an embodiment given by way of a simple illustratory and non-exhaustive example and from the appended figures, of which:

Figure 8:
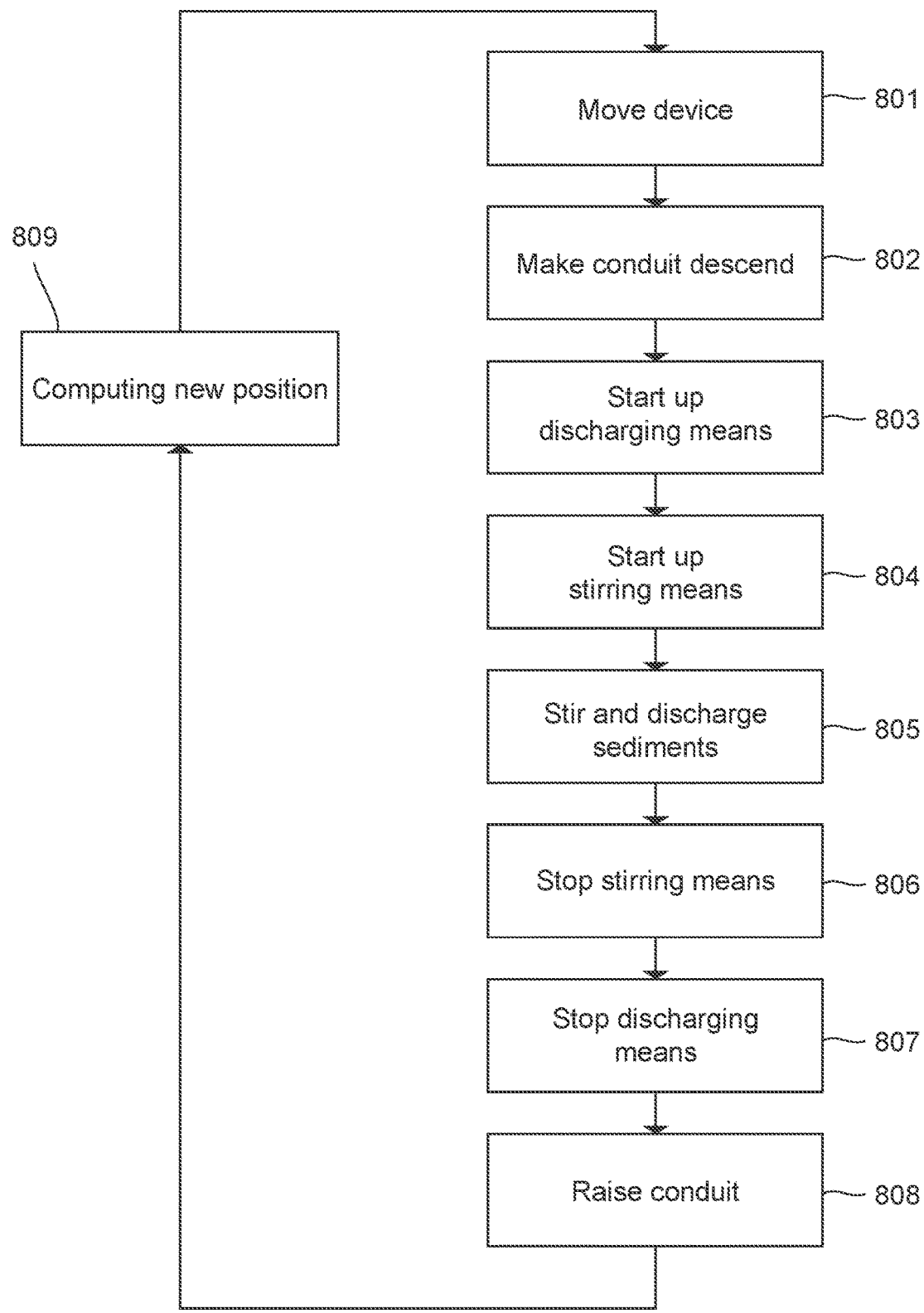
Figure 9:
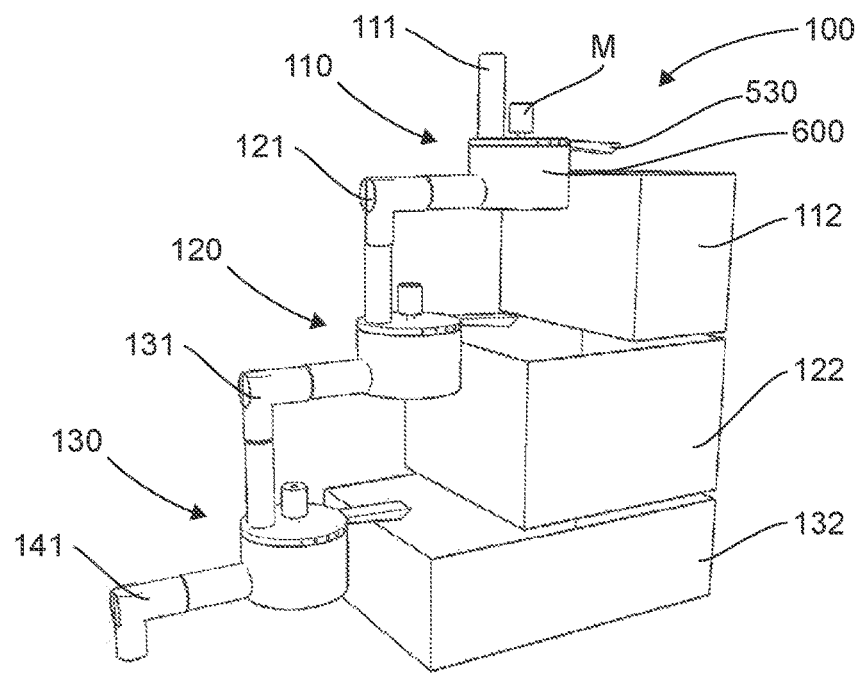
Figure 10:
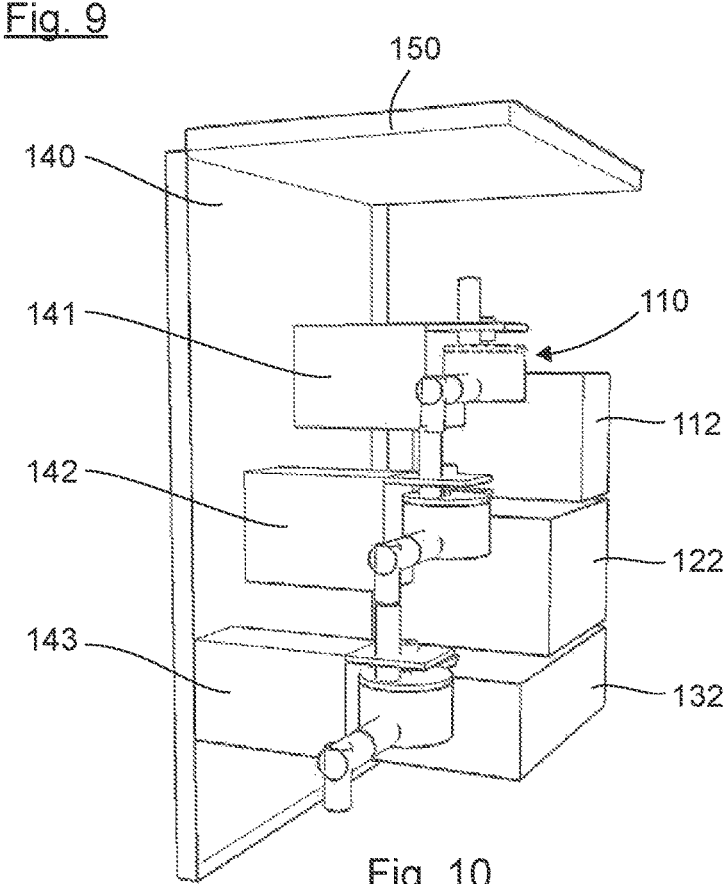
Figure 11:
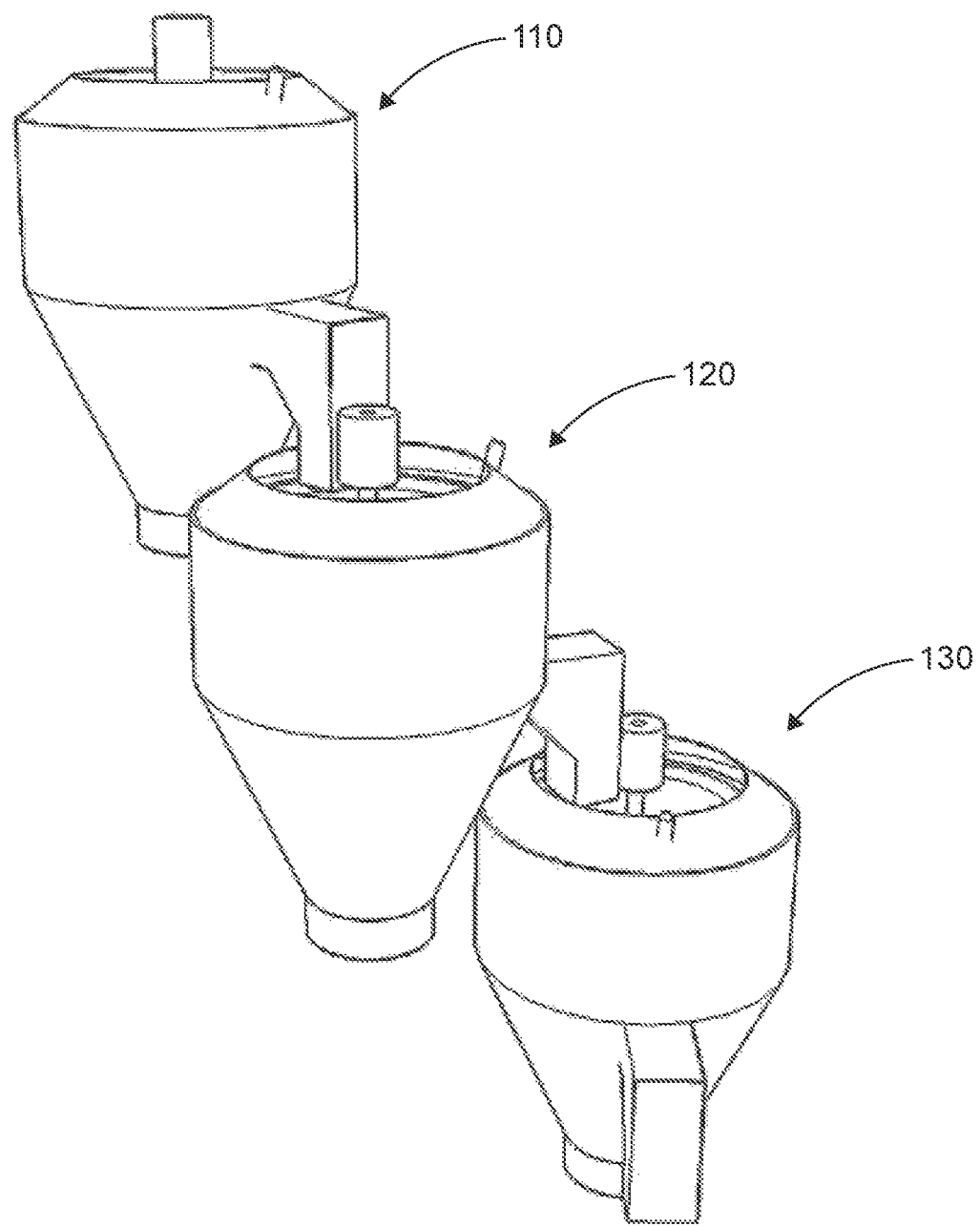
Figure 12:
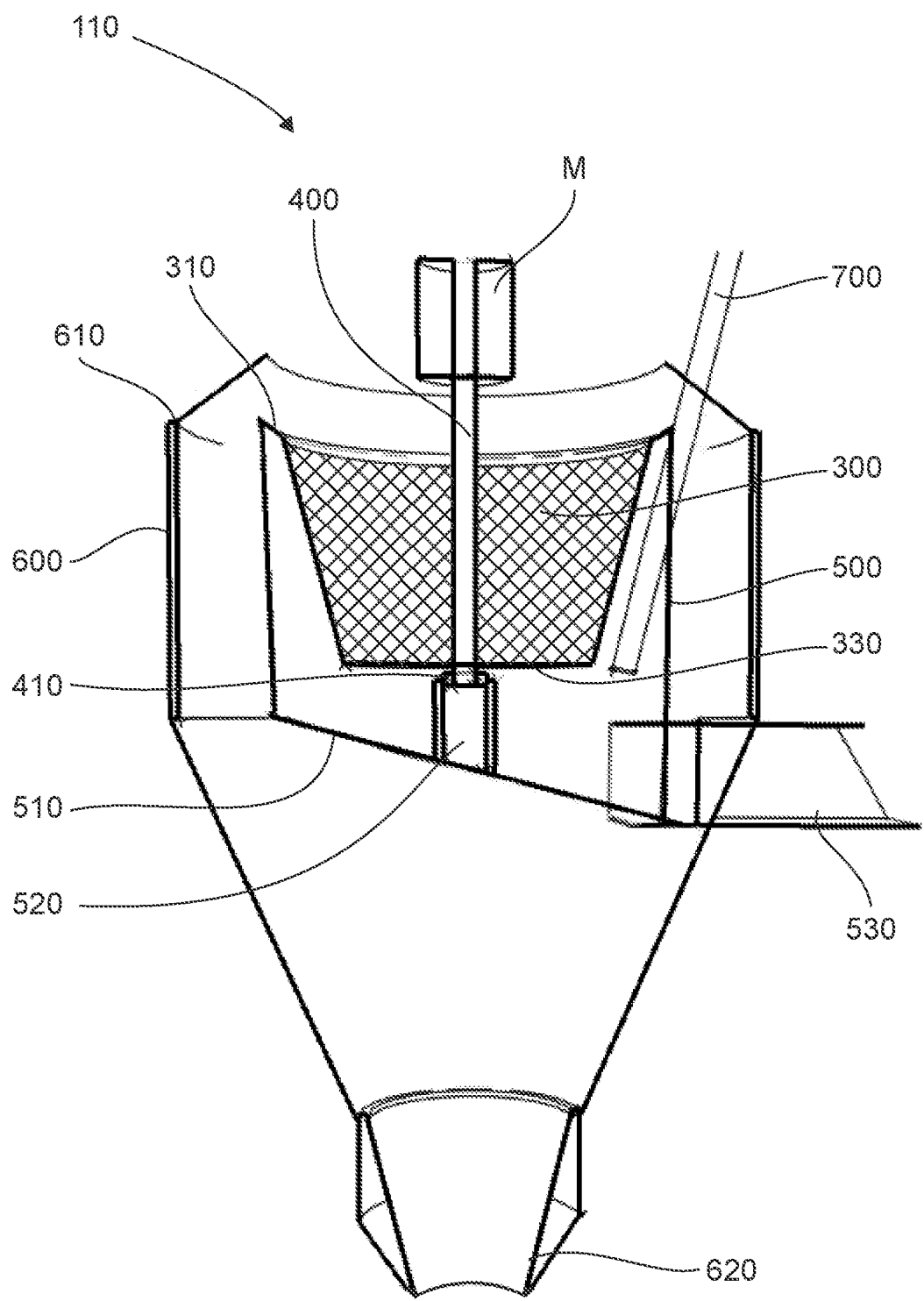
Figure 13:
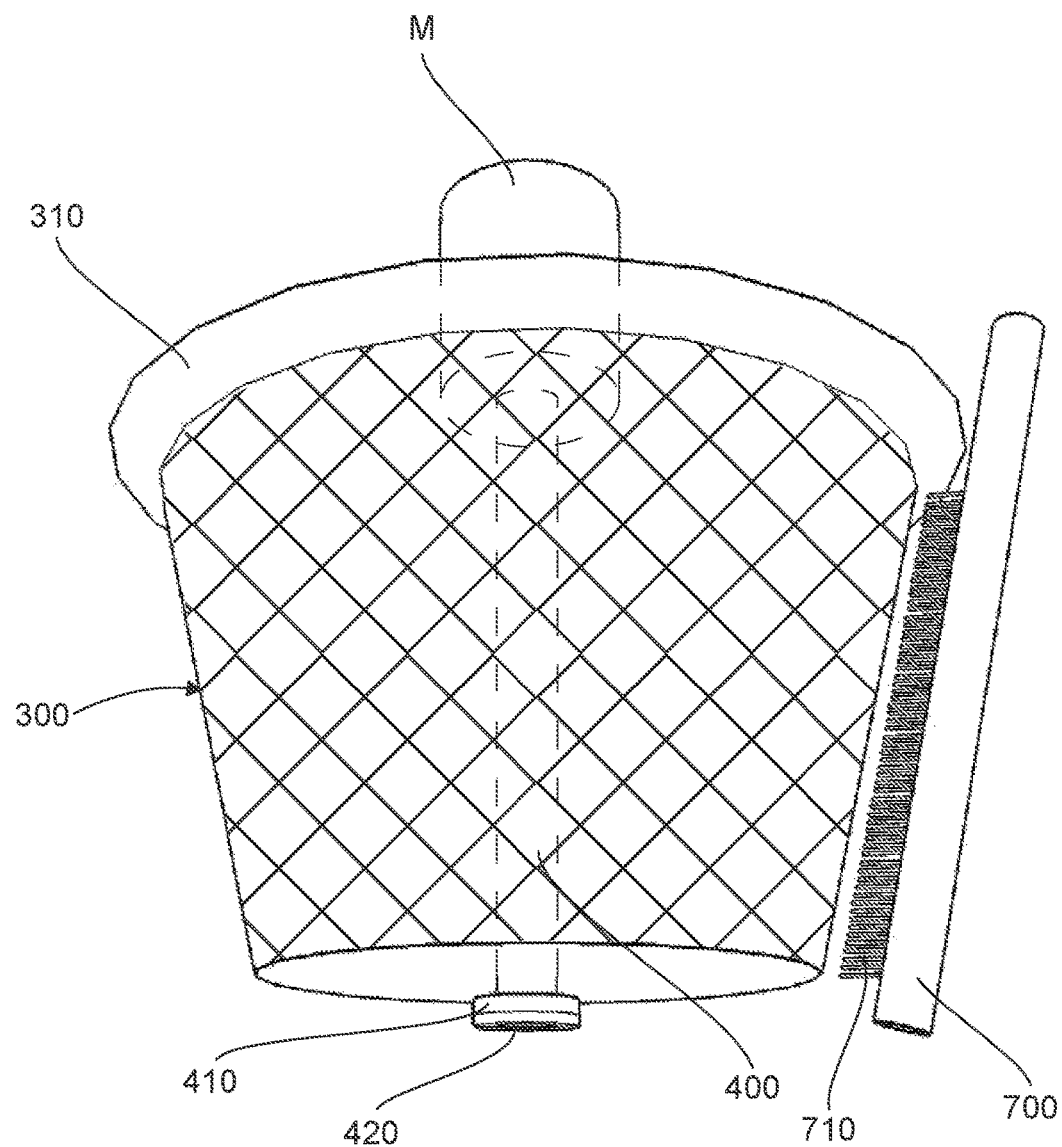
Figure 14:
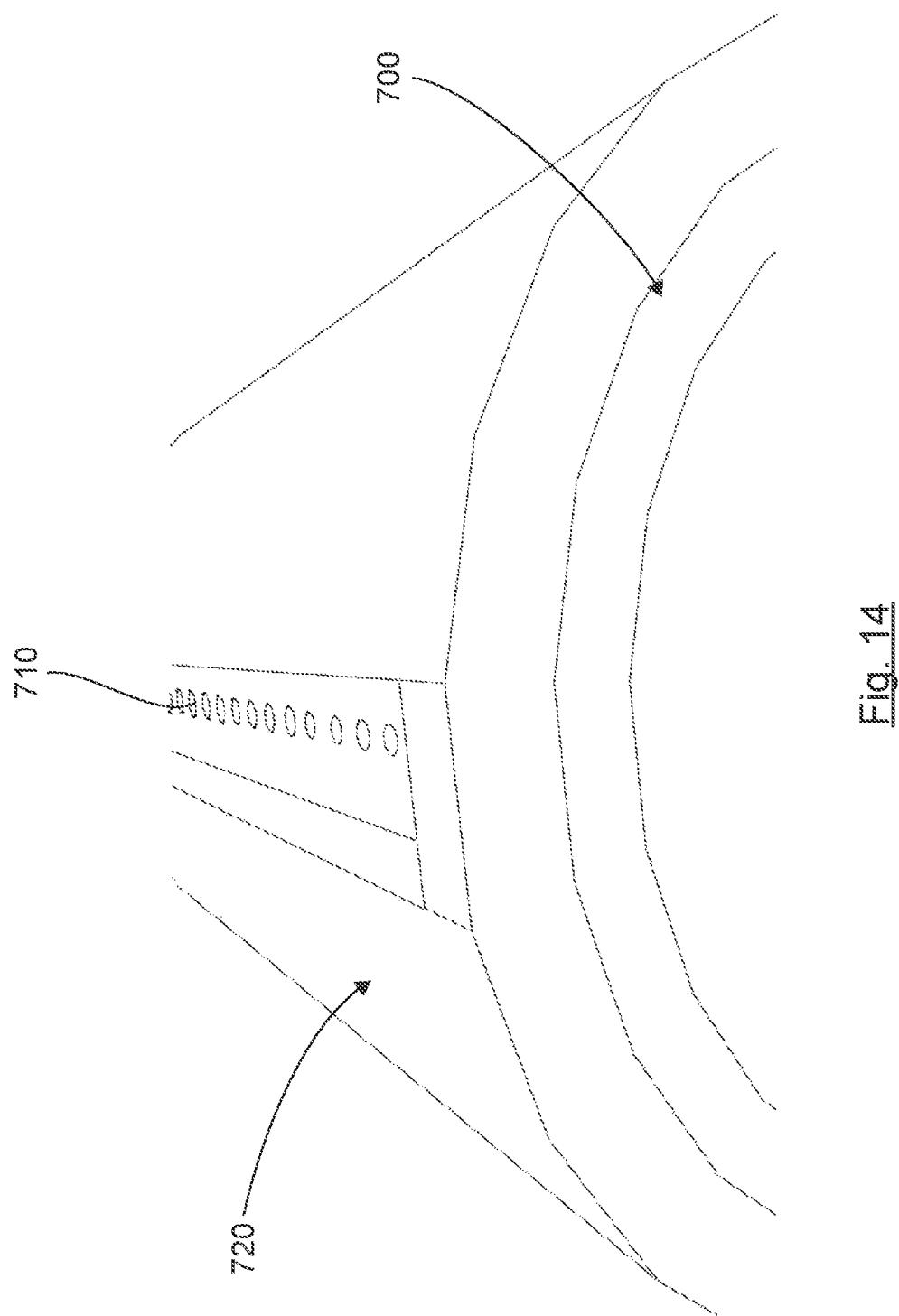
Figure 15:
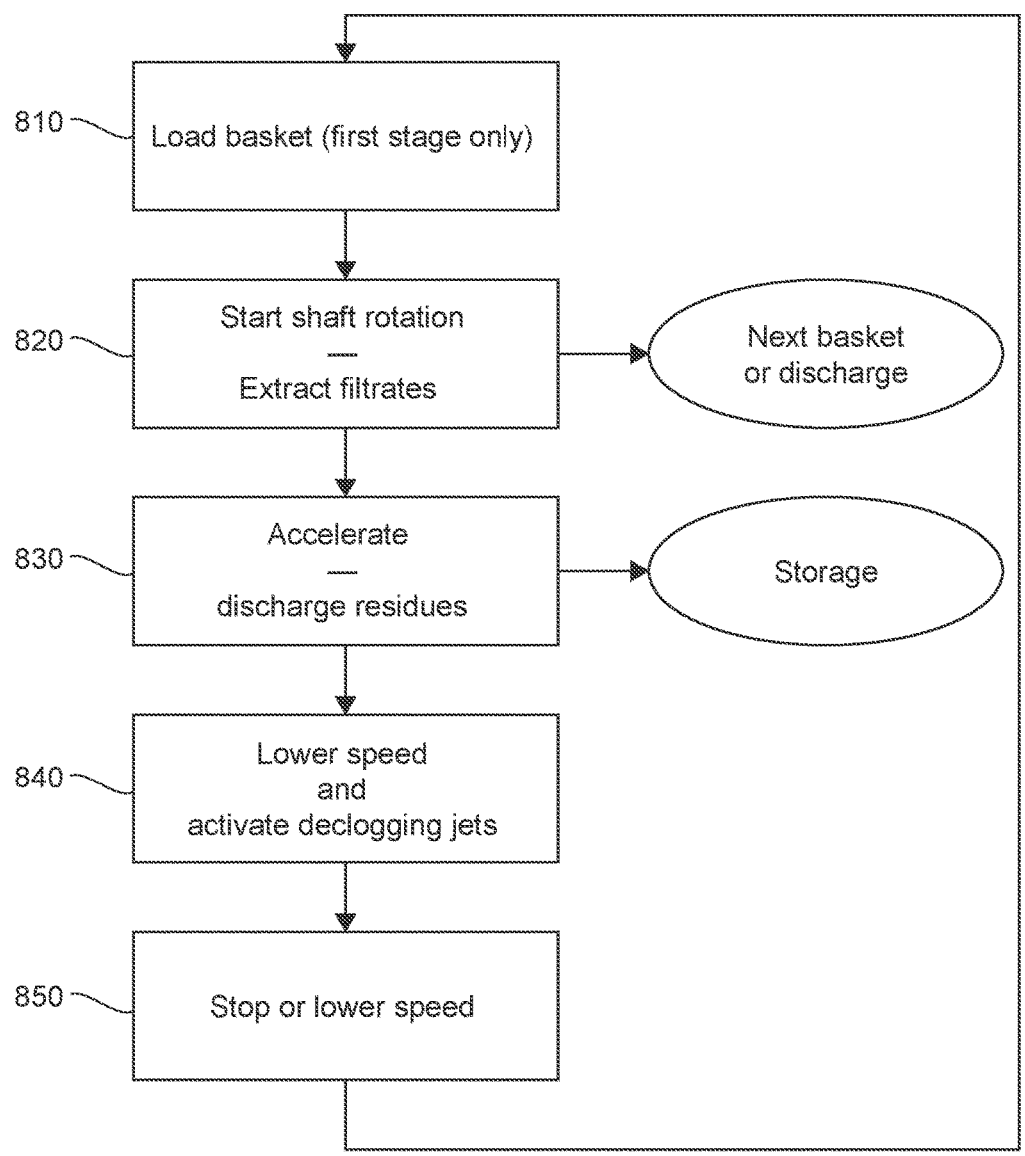
Figure 16:
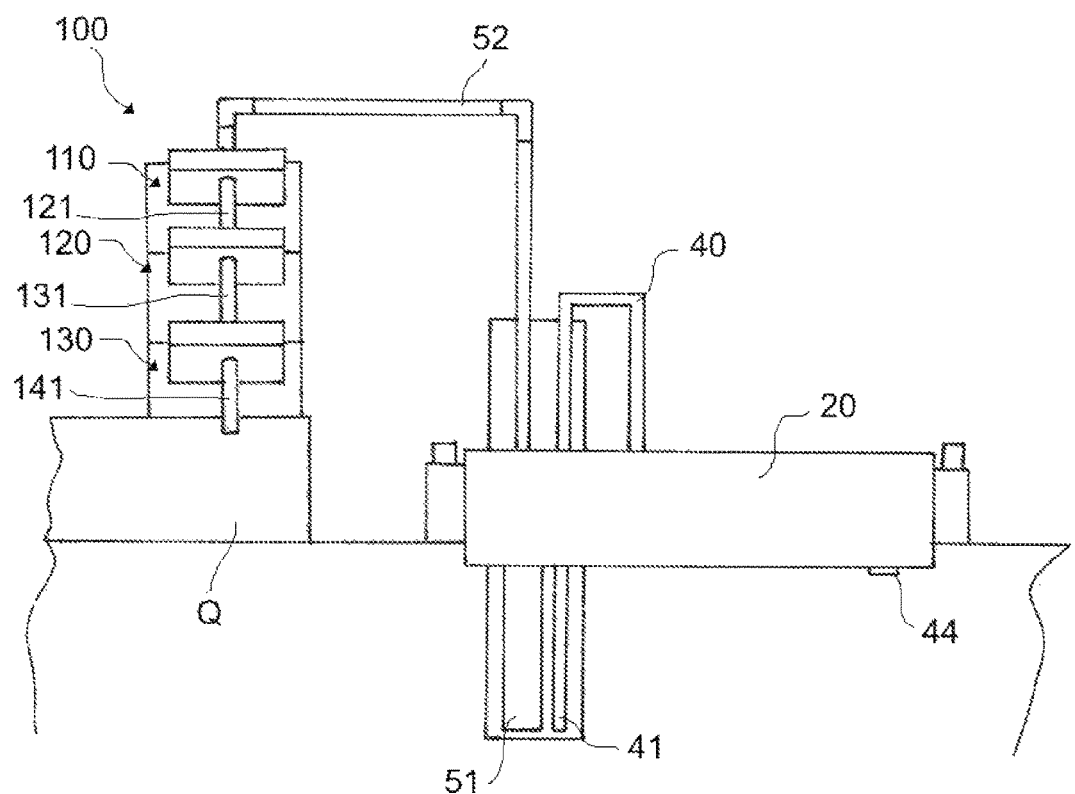

FIGS. 7A to 7D present four embodiments of the system of removal;

FIG. 8 illustrates the iterative steps of the method for removing sediments associated with the system for removing sediments;

FIG. 9 presents a 3D view of the sieving device according to the invention;

FIG. 10 represents the structure for holding the sieving device according to a first embodiment;

FIG. 11 represents the sieving device according to one particular embodiment;

FIG. 12 presents a view in section of a sieving stage according to this particular embodiment;

FIG. 13 is a 3D view of a sieving basket and of the associated high-pressure cleansing system;

FIG. 14 represents a variation of the high-pressure cleansing system;

FIG. 15 illustrates an example of the method for implementing according to the invention;

FIG. 16 is a view of the removal system shedding sediments into the sieving device.

5. DESCRIPTION OF ONE EMBODIMENT OF THE INVENTION 5.1 General Principle

The invention pertains to the processing of sediment accumulated on the bed of liquid environments such as harbors or ponds. Two aspects of the processing are described. These aspects can be implemented in a same processing unit (as illustrated in FIG. 16). These two aspects are described here below, first of all independently, and they can if necessary be implemented independently of each other.

The removal is carried out by means of a floating unit (§ 5.1.1 and § 5.2), the extraction tube 52 of which delivers the sediments taken from the bed. In the embodiment illustrated in FIG. 16, the extraction tube 52 directly feeds a device 100 for pre-processing sediments (§ 5.1.2 and § 5.3) installed for example on a dock Q and a bank. According to other implementations, the pre-processing device can be taken on board the floating unit 20 or on a dedicated floating unit placed in proximity. An independent implementation (the sediments being stored in the meantime) can also be planned. Finally, it is also possible, for all or part of the sediments removed, to carry out another pre-processing operation. In the same way, the pre-processing can be applied also to the sediments obtained by another type of removal.

5.1.1 System for Removing Sediments

Such a system comprises especially:

a mobile suction mouth under atmospheric pressure designed to be placed appreciably at the level of the bed, means for carrying out a local stirring at the bed, within the mouth, enabling if necessary the detachment and stirring (or shuffling) of sediments, and means for removing said sediments detached from the bed and mixed with water, connecting the mouth to the surface of the liquid environment, a local depression being thus created at the level of the mouth.

These means can extend into the interior of a conduit open at both its extremities, such a conduit being supported by at least one floating element that keeps it partially submerged.

The lower extremity of the conduit, constituted by the rigid mouth, touches the bed or is flush with it whereas its upper extremity is kept in the open air under atmospheric pressure. Thus, when the means for discharging the mixture of sediments and water are activated, a local depression is created within the tube as and when the mixture is discharged and as and when the level of liquid falls. The sediment-soiled liquid is thus contained within a cleansing perimeter limited by the conduit, and its shaking or stirring will not affect or will only slightly affect the neighboring environment.

According to the embodiments, the system of the invention comprises a surface unit or a floating unit and/or bed unit, or submerged unit, that can be motor-driven and mobile in an independent way, without human action required during cleansing, once appropriate programming has been done.

5.1.2 System for the Pre-Processing of the Sediments

Once the sediments have been removed, according to the technique described here above or as the case may be according to another approach, they are "conveyed" to a device for the pre-processing of the sediments comprising at least two successive stages (or a single stage in certain cases).

Such stages can for example be arranged as in a stairway or side-by-side. The sieving of the sediments enables the gradual drying of the sediments by dissociating the solid particles from the liquid sucked up during the step for removing the sediments.

Each of the sieving stages comprises a sieving basket having meshes of pre-determined size. This basket can be driven in rotation inside a container so as to separate the filtrates passing through the mesh of the basket and the residues that do not pass through the mesh.

At least one of the sieving stages comprises means for projecting fluid under pressure on the periphery of said sieving basket, from the exterior to the interior of the basket.

This projection of fluid under pressure enables especially the cleansing of the cells or meshes of the basket. The particles blocking the cells of this sieving basket are thus efficiently put back into motion and these cells are permanently unplugged. The means for projecting fluid can comprise a single nozzle or a plurality of nozzles (for example aligned) each delivering jets throughout the height or at least a large part of this height. They can be fixed or mobile relative to the container and/or to the basket.

5.2 Removing Sediments from the Bed of a Liquid Environment 5.2.1 Example of a Floating Unit FIGS. 1, 2, 3 and 7A present a floating unit 20 supporting a conduit 30 mounted for example vertically, the upper extremity of which is held in a housing 21 provided for this purpose in the floating unit. According to the embodiment illustrated, the floating element takes the form of a rectangular barge with approximate dimensions of 2 m×1 m but can take any other shape or appearance (circular buoy, boat etc.) provided that the functions of floating and keeping the upper extremity of the conduit 30 under atmospheric pressure are fulfilled.

The conduit 30, which for example has a circular section with a diameter of about 50 centimeters, has a rigid lower extremity forming a mouth 30. The shape of the conduit and the mouth can of course not have a circular section but also for example a square section a rectangular or oval or even any unspecified section.

This conduit 30 can be deployed vertically or not vertically, provided that this rigid extremity rests on the floor to be cleansed. This conduit 30 on the one hand envelopes feeding means 40 enabling one or more jets under pressure to be directed, the water being pumped to the surface by a high-pressure pump 40 and propelled towards the bottom of the conduit 30 by the conduit or conduits 43.

Figure 5:
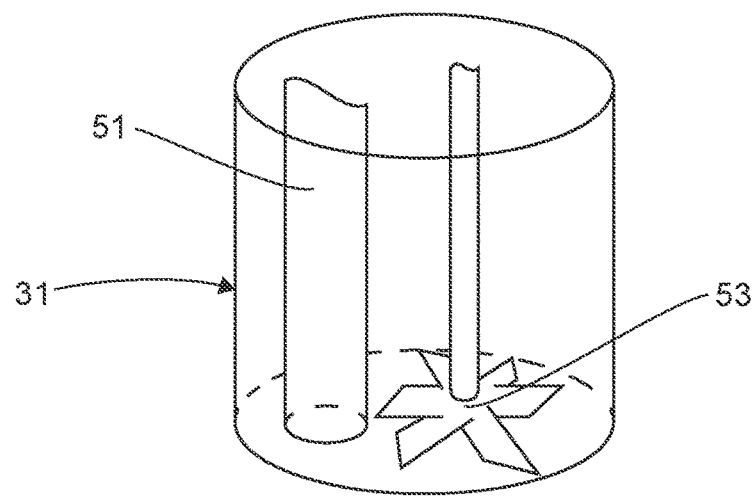
FIG. 5 represents a second embodiment of the means for carrying out a stirring in the lower extremity of the conduit.

Mechanical stirring means can also be implemented in another embodiment as presented by FIG. 5 in order to ensure the detachment and stirring of the sediments. For example, means similar to a scarifier 53 and/or a rotationally driven fan can be used.

This stirring means generate local stirring in the lower part of the conduit 30 and make it possible if necessary to detach sediments present at the bed.

This conduit 30 also envelopes a discharge channel 50 enabling a mixture of water and sediments to be raised to the surface. The suction of this mixture of water and sediments and therefore the reduction in the level of liquid in the conduit 30 creates a depression at the base of the conduit, thus holding back the soiled water within the cleansing perimeter defined by the lower extremity of the conduit resting on the bed.

Figure 1:
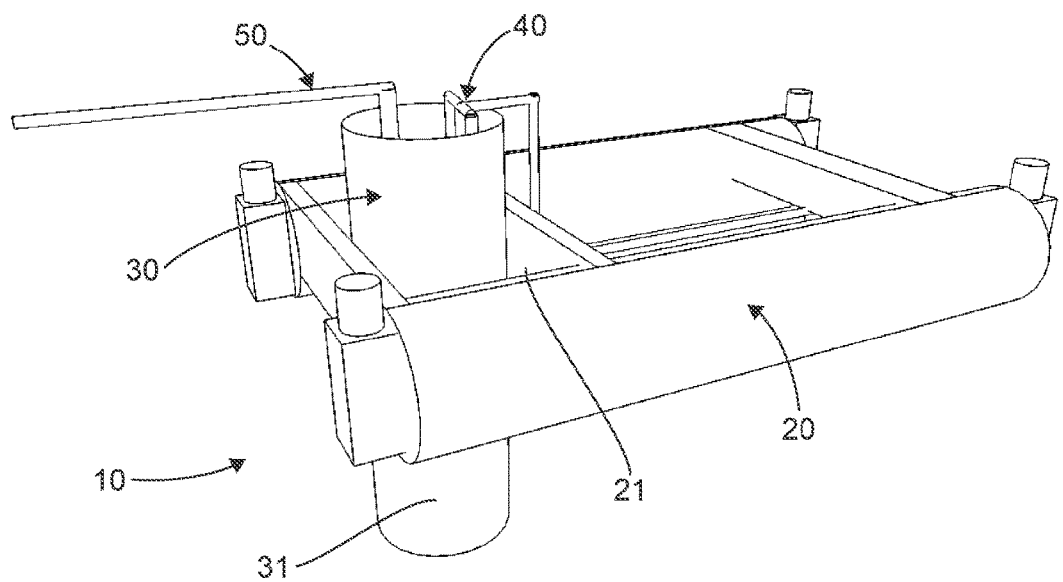
FIG. 1 represents an example of a system of removal according to the invention, seen in a side view.
Figure 2:
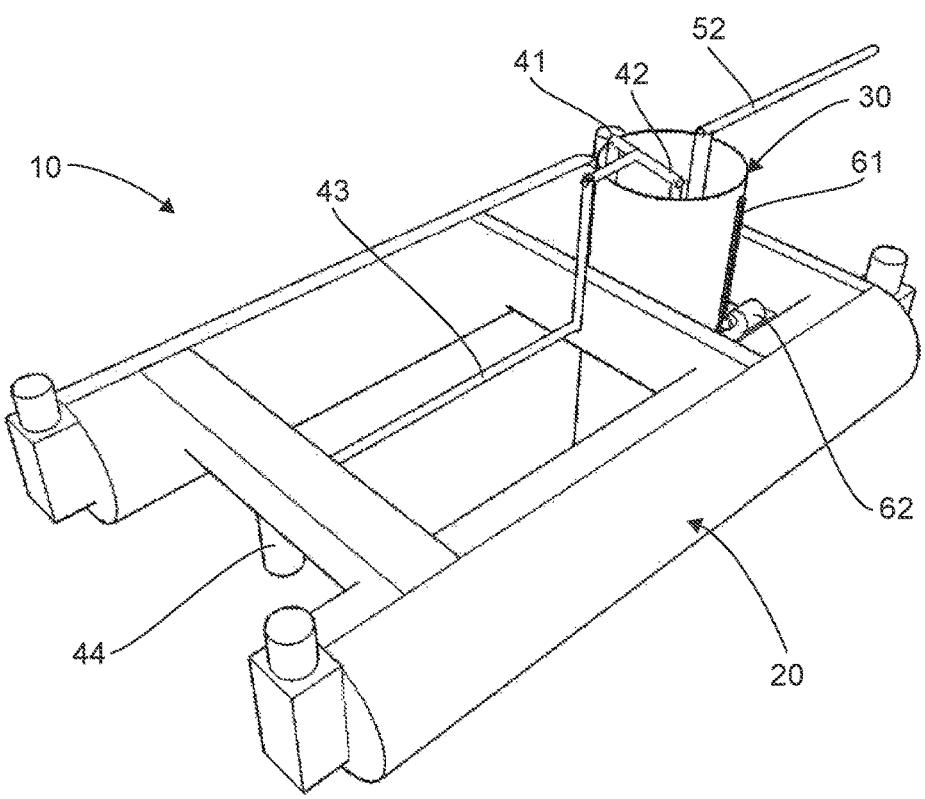
FIG. 2 represents the system of removal of FIG. 1, seen in a top view.
Figure 3:
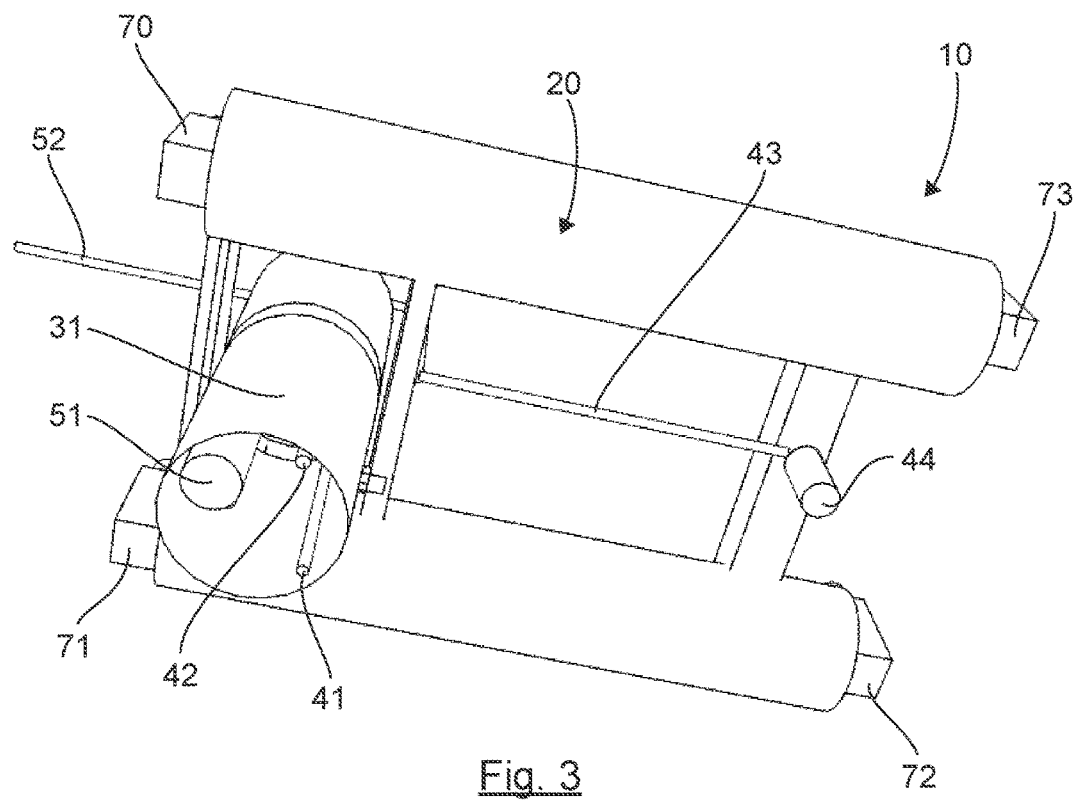
FIG. 3 is a bottom view of the system of removal of FIG. 1.

In the preferred embodiment described, the feeding means supply two jets of water under high pressure, guided in the channels 43 then 41, 42 as can be seen in FIG. 3. These channels extend into the interior of the conduit 30, their first extremity being flush with the floor and their second extremity being connected to the channel 43 out of the conduit which itself is connected to a high-pressure pump 44.

The extraction of the mixture of sediments and in water is done via the discharge channel 50 which extends above the surface by an extraction to 52 which joins a sediment collection unit (not shown), which for example takes the form of a barge. A pump 51 carries out the propulsion of the sediments brought to the surface by the extraction conduit 52 which is itself in the conduit 30.

The conduit 30 can be adjusted in height relative to the floating element 20. For this purpose, in the embodiment illustrated, a rack arrangement 61 fixed vertically to the external surface of the conduit 30 engages with a toothed shaft driven rotationally by a motor 62 fixed to the floating element outside cavity 21.

Means for controlling the position of the conduit, for example a sonar unit, can be used for the precise and automatic adjustment of the lower extremity of the conduit relative to the floor.

Figure 4:
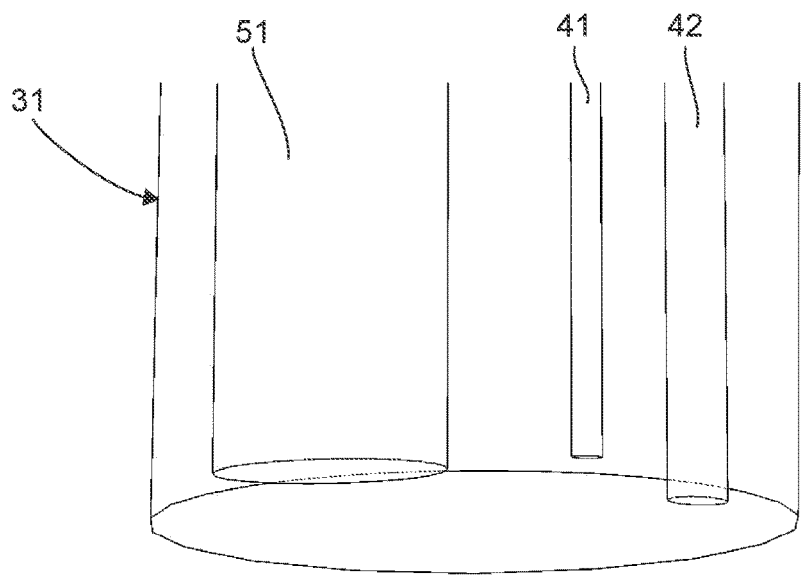
FIG. 4 illustrates a first embodiment of the means for carrying out a stirring in the lower extremity of the conduit.

FIG. 4 illustrates the lower extremity of the conduit 30 when a cleansing operation is in progress and when it rests on the floor.

Means of providing movement, for example four motors, 70, 71, 72, 73, are fixed to the sides of the floating unit 20. In one particular embodiment, four cables anchored to four anchoring points (for example on the bank) demarcating an area to be processed, are connected to the four motors: the actuation of the motors drives the winding of the cables or their winding as needed and the shifting of the floating unit 20 along a path with four translational components.

Automation means can be planned so that the floating unit moves independently and covers the totality of a pre-defined surface using means of mapping, positioning, obstacle avoidance etc. In one particular embodiment, the movement of the floating unit is managed by a global positioning system (GPS) or the like. Global positioning makes it possible especially to locate and identify macro-wastes and ensure the traceability of the cleansing operations and of the path taken.

Means for collecting floating objects can be provided on the floating unit 20, for example to recover invasive plants in the case of water weed-cutting operations.

5.2.2 Examples of a Bed Unit

Figure 6:
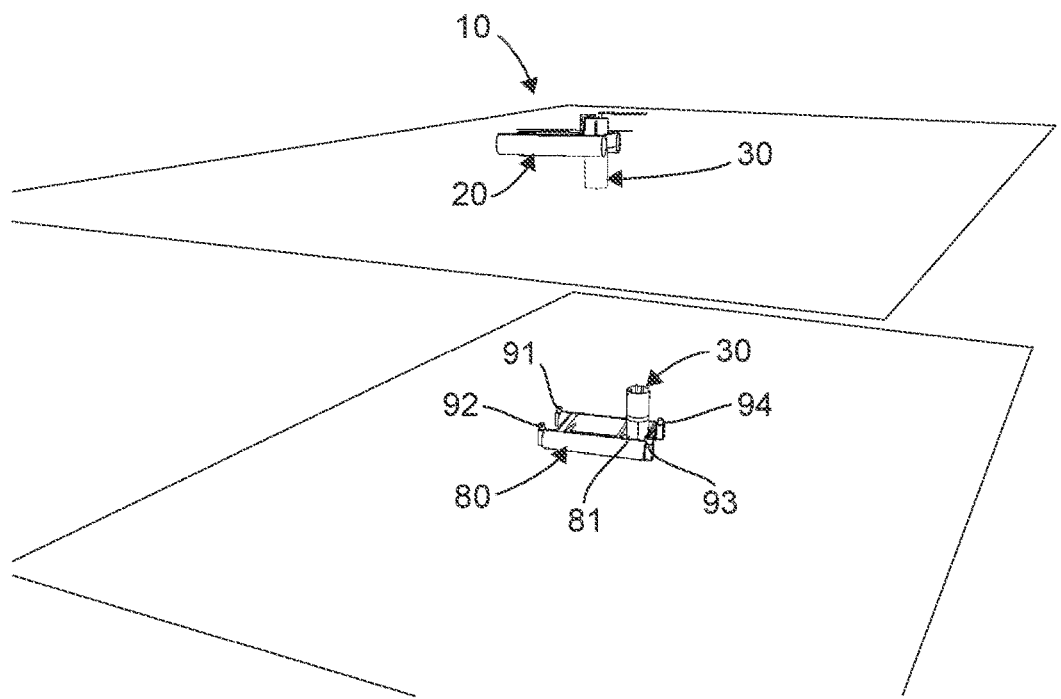
FIG. 6 illustrates an alternative embodiment of a system of removal implementing an underwater unit.
Figure 7A:
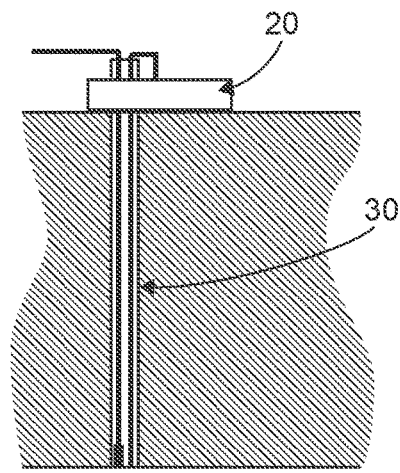
Figure 7B:
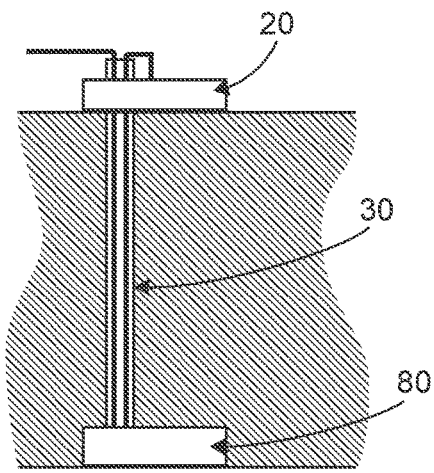

As illustrated in FIGS. 6 and 7B, the removal system can implement a bed unit 80 that moves on the bed to be cleansed. This bed unit 80 can move beneath the floating unit 20 or it can be capable of moving relative to this floating unit 20, especially in order to reach zones to be cleaned that are poorly accessible (beneath boats or pontoons for example) or in order to leave the navigable waterways free. The bed unit 80 has a housing 81 in which the rigid lower extremity of the conduit 30 is mounted. This bed unit 80, which is ballasted so as to lie on the bed (using ballast for example) takes for example a shape similar to that of the floating unit 20 keeping the upper extremity of the conduit 30 out of the water.

Figure 7C:
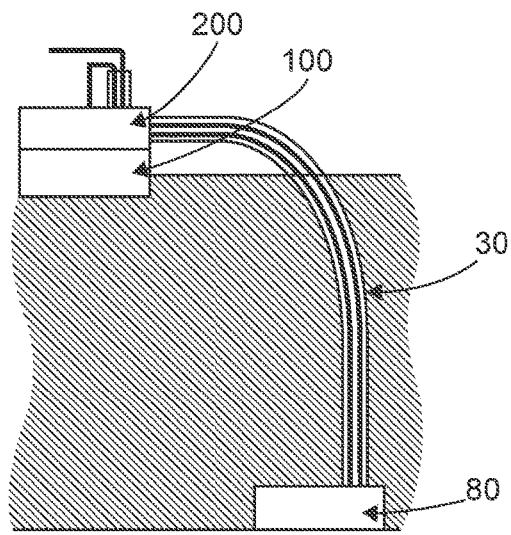
Figure 7D:
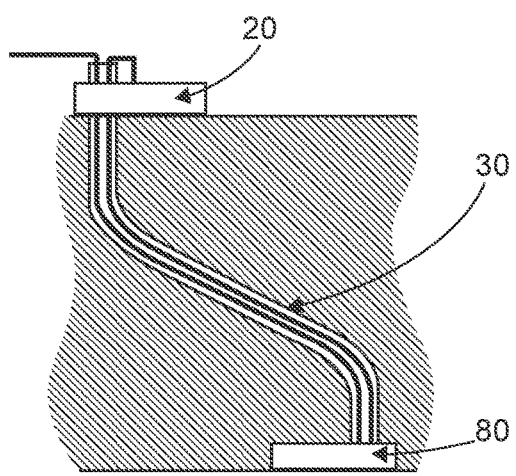

Since the bed unit 80 and the floating unit 20 are not necessarily on top of one another, the conduit can be made out of a flexible material or it can include pivoting means. Such variants of the implementation of removal systems are represented schematically in FIGS. 7C and 7D. FIG. 7C illustrates an underwater unit 80 connected to a fixed unit 200 placed on board a dock Q for example by means of a flexible conduit. FIG. 7D represents a bed unit 80 and a floating unit 20 that can be moved relative to each other by means of such a flexible conduit.

Moving means, for example four motors 91, 92, 93, 94 (represented in FIG. 5) can be fixed to the bed unit 80 as an addition or instead of those of the floating unit 20. Other moving means can be implemented, such as moving means using a crawler-based system.

This bed unit 80 could, like the floating unit 20, be controlled in an automated way and its movement can be programmed.

5.2.3 Functioning

The deposition of sediments on the water beds is the source of the silting of spaces such as harbors and ponds.

These sediments are extracted according to the invention by means of a removal system 20 comprising a floating unit 20 made to float on the surface of a water point and then moved towards an area to be cleansed by an operator, for example by tugging or by remote control. Here the motors 70, 71, 72, 73 situated at the extremities of the floating element 20 enable the device 10 to be easily oriented between potential obstacles (boats, pontoons etc.).

The removal device 10 can also be shifted in an automated way. To this end, it comprises positioning means (for example a GPS system) enabling it to work on a long pre-defined path in a pre-defined sector. A "local" positioning system using distributed sensors over an area is also possible.

Once the position concerned is reached, the motor 62 fixed to the floating element 20 is actuated, and its toothed shaft engages with the rack 61 fixed to the conduit 30. Thus, the position of the conduit 30 in depth is adjusted heightwise in such a way that it flush with the bed to be cleansed. Means for detecting the position of the conduit 30 can make it possible if necessary to obtain an automatic adjustment of its lower extremity.

Since the upper extremity of the conduit is open and in the open air, the conduit 30 is under atmospheric pressure.

The suction pump 44 is put into action and injects a jet of water under high pressure into the channel 43. This jet of water is then guided between the two channels 41, 42 until the floor. The pressure of the water jets on the layers of sludge detaches the sediments from the floor and mix the sediments with the water present in the conduit 30.

At the same time, the low pressure caused by the extraction by the discharge pump 51, relative to the atmospheric pressure, provides for the suction of the mixture of sediments and water up to the surface. The sediments and water are then sent to a collecting unit via the extraction tube 52 by means of the pump 51.xxx The fact that the conduit 30 remains under atmospheric pressure and demarcates a restricted working perimeter on the floor eliminates re-mobilization during the removal of polluted sediments and prevents the contamination of the aquatic environment by stirred toxic sludge. The particles in suspension are indeed confined to the interior of the conduit 30 until they are sucked in by the pump 52 and until the corresponding zone is cleansed.

The conduit 30 can then slide upwards through height-regulating means 61, 62 so as to be moved to another area to be de-silted. Generally, this area neighbors the one that has just been cleansed and the cleansing is done gradually, by small successive zones (for example 40 cm$^2$ and 1 m$^2$).

5.2.4 Example of Implementation

An example of the method for removing sediment from a water bed is illustrated in FIG. 8. In this embodiment, it has four main iterative steps corresponding to the steps of operating the device for removing sediments as presented in the previous paragraph:

- a step 801 for moving the device up to the zone to be cleansed. As the case may be, the floating part and/or the underwater part are moved so that the mouth is situated plumb with the desired position;
- a step 802 for heightwise adjustment of the conduit 30, making this conduit descend until its lower extremity is flush with the bed to be cleansed. This step is done once the device is stabilized on the surface of the water. A sensor and/or sonar device enables precise control;
- a step 803 for putting discharging means into operation, especially the pump 51, tending to empty a part of the content (water) from the conduit 30. The suction of water by the pump 51 creates a depression in the cleansing area. It is desirable that the preceding step 802 for making the conduit descend be terminated before this step 803 starts so that the cleansing perimeter (corresponding to the zone defined by the mouth) is properly defined and circumscribed;
- a step 804 for starting up the stirring, for detaching the sludge from the bed by starting up the pump 44. Preferably, the starting up of the stirring means (water jets and/or mechanical means) begins a few instants after the pump 51 is started;
- a step 805 for the suction of the mixture of water and sediments by the extraction pump 51 because of the depression created by the conduit. The step 805 combines the effects of the steps 803 and 804, prompting the detachment of sediments in a confined space and the discharging of these sediments. The steps 804 and 805 can also be carried out at the same time. The stirring and/or the suction can be made to vary (with stops, changes in speed, changes in sense of rotation, power etc.) and to move the stirring means within the mouth;
- a step 806 for stopping the stirring means;
- a step 807 for stopping the discharge pump 51 a few minutes after the pump 44, in order to discharge the sediments still contained in the conduit 30;
- a step 808 for raising the conduit so as to move it away from the floor to enable the moving of the device. It is desirable that the step for suction of the sediments should be terminated before the conduit is raised;
- a step 809 for computing a new position to be cleansed. This computation is preferably automated, for example by means of a calculation rule determining a position to be attained, classically next to the one that has just been processed, and taking into account especially already processed zones, obstacles if any, pre-determined processing plan, an optimizing of paths to be followed etc.

Once this new position has been determined, the device moves or is moved up to a new zone (step 801) restarting a new iteration of the nine steps.

An iteration, i.e. the processing of a zone corresponding to the surface covered by the mouth can last between 2 minutes and 15 minutes.

This method for removing sediments according to the invention can thus remove sediments continuously over time without any need to resort to specific one-time and periodic dredging operations (for example every five years) and without any interruption of activity (especially for a harbor).

The device can for example enable the processing of 1 m$^3$ to 3 m$^3$ of silt per hour, i.e. 8,000 m$^3$ to 16,000 m$^3$ of silt per year depending on the embodiments. The approach of the invention thus counters the classic approach which provides for periodic cleansing for a lapse of time lasting a few weeks during which the harbor or pond cannot be used normally. Indeed, according to the invention, the cleansing extends over a long duration and can even be continuous: thus, small quantities are processed permanently without disturbing the activity of the harbor or pond, and without greatly disturbing the sludge and the sediments.

In addition to these advantages, the approach of the invention is particularly economical and has the following advantage: since the bed is cleansed permanently, at the end of 5 years, it is necessary only to carry out maintenance which is ensured by the system of the invention whereas according to the prior art the bed once again becomes completely silted.

It is of course possible to plan for several devices according to the invention working simultaneously. In this case, the computation of the positions can be done in a centralized way to ensure optimized processing and prevent any collisions.

The sediments removed can generally be powdery or loamy comprising a liquid phase and a solid phase. They need to be dried so that they can be stored or recycled.

Thus, these sediments need to be conveyed to a pre-processing and sieving device as described here below and illustrated in FIG. 16.

5.3 Pre-Processing and Sieving of the Sediments 5.3.1 Constituent Elements

FIGS. 9 and 10 present a device 100 for the pre-processing of sediments comprising three sieving stages 110, 120, 130.

Each stage 110, 120, 130 of the pre-processing device 100 comprises three stages 11, 12, 13 forming a centrifugal system used to gradually dry the sediments, by the sieving of sedimentary particles that are constantly smaller. The stages 110, 120, 130 are assembled in stairway form in one embodiment illustrated in FIGS. 9 to 11 but could also be assembled as columns or side by side.

As illustrated in FIG. 10, the stages 110, 120, 130 can be fixed to a structure comprising one or more walls 140 and one or more roofs 150 forming a shelter and designed to rest on the floor or on a barge. A wall 140 of this structure comprises especially on its internal phase projecting elements 141, 142, 143 that keep each of the sieving stages fixed relative to each other and relative to the floor. Other maintaining structures can also be envisaged such as an openwork or perforated structure.

FIG. 11 presents the sieving stages 110, 120, 130 of the device according to one preferred embodiment. In particular, each figure comprises a tank closed by a hood, provided with a high-pressure cleansing system, an overflow nozzle tip and a discharge tube as described more specifically here below with reference to FIG. 12.

A first sieving stage 110 forming a first centrifugal system thus comprises a basket 300 provided with meshes on its surface so as to form a filter that lets through only particles of a certain size. The basket 300 preferably has a truncatedly conical shape, the perimeter of its upper edge being greater than the perimeter of its lower edge, the basket 300 thus being flared at its upper edge. The basket 300 is also provided with an ejector rim 310 in this upper part as illustrated in FIGS. 12 and 13. The dimensions of such a basket correspond with the volumes of sediments to be extracted during the totality of a cycle.

Such a basket 300 can also take any other shape facilitating the drying and ejection of the sediments. It is possible for example to implement a basket capable of changing its tilt depending on the processing phase. Thus, the basket has a nominal diameter in a drying phase and a greater diameter in a phase for ejecting sediments. This can for example be obtained by three means for sliding at an angle of 120° in the upper part of the basket.

This basket 300 is fixedly joined to a shaft 400 capable of being actuated in rotation by a preferably electrical motor M. Thus, the pedestal of the basket is advantageously mounted so as to be tightly fitted about the rotation shaft 400 but a mechanical link by belt or by a reduction gear can also be envisaged.

A container 500, with a diameter slightly greater than that of the basket and provided with a tilted pedestal 510 receives the sieving basket 300, the lower extremity of the shaft 400 being linked to the pedestal 510 of the container 500. To this end, the lower extremity of the shaft 400 is provided with a base 410 comprising a ball bearing 420 and co-operates with a bearing support 520 emerging at the center of the pedestal 510 of the container 500.

The container 500 is mounted in a vessel 600 which can have any type of shape (cylindrical, cubical, truncatedly conical etc.). In the embodiment described, the vessel takes a substantially truncatedly conical shape comprising, beneath the container 500, an element shaped like a funnel designed to discharge residue. The term "residue" is understood to mean those sediments deposited in the sieving basket 300 that are too big to go through the meshes of the basket.

The vessel 600 is provided with a hood 610 pierced at its center so as to receive the shaft 400 to which the sieving basket 300 is fixedly attached. The motor M used to put this shaft 400 into rotation and activate the centrifugal process is situated at the upper extremity of the shaft 400 and above the hood 610.

Besides, the container 500 is fixed by different points to the vessel 600, the container 500 and the vessel 600 forming a fixed assembly. Thus, at the end of a certain centrifugation time and because of an increase in the rotation speed, those residues that are too bulky to pass through the meshes of the basket 300 are ejected out of the basket 300 via the ejector edge 310 and fall into the vessel 600, and are then conveyed for conditioning by gravity up to the extremity 620. The residues can if necessary be then recovered in a storage vat as shown in FIGS. 9 and 10.

Besides, the container 500 is connected with means for discharging filtrates which for example take the form of an overflow nozzle tip 530 (or a tube or a channel etc.) placed at the lowest extremity of the container. The term "filtrates" refers to the all the liquid and sedimentary particles that have gone through the meshes when the basket 300 is put into rotation.

The container 500 is also provided with means for projecting fluid under pressure. In the embodiment described, these means comprise a channel 700 for transporting fluid (preferably water but as the case may oil or petroleum) provided with plurality of nozzles 710 on a part of its height. These nozzles are shown in a more detailed view in FIGS. 13 and 14. The channel 710 is inserted so as to be inclined through the hood 610 of the vessel 600 and of the container 500 so as to orient the nozzles 710 for the projection of fluid perpendicularly to the outer surface of the basket 300 and on its entire height. The nozzles 300 are thus positioned so as to brush against the external surface of the basket 300. In one alternative embodiment, a single mobile nozzle moves along the channel 710 in order to project the fluid between the lower edge and the upper edge of the filter of the basket 300. In another embodiment, shown in FIG. 14, the nozzles 710 are uncovered and respectively covered again by a rotation of a shuttered casing 720 around the channel 700 in order firstly to enable (and respectively prevent) the projection of fluid under high pressure arriving in the channel and secondly to prevent the particles that pass through the basket 300 during centrifugation from obstructing the nozzles. The rotation of the casing can for example be initiated naturally by the rise in pressure in the channel. Naturally, the means for projecting fluid under pressure are not limited to the examples mentioned here above.

The fact of projecting fluid under pressure on the entire external surface of the basket 300 and towards interior of the basket makes it possible especially to unclog the meshes of the filter that have been blocked by sediment and to put the particles in movement again.

The sieving stage 110 is connected to the sieving stage 120 by the overflow nozzle tip 530 guiding the filtrates from the container 500 to the next sieving basket. As shown in FIGS. 9 and 10, the different sieving stages 110, 120, 130 of the device 100 can also communicate with each other through a system of pipes comprising, in the case of a stairway assembly, angular discharge tubes 111, 121, 131. In the case of a column assembly, these discharge tubes would be straight. The sediments are thus shed into the sieving basket 300 of the first stage 110 through a first discharge tube 111.

The vessel 500 of the first stage 110 is open on to a second discharge tube 121 which discharges the filtrates. This tube 121 is oriented by a bend towards the sieving basket of the second sieving stage 120. A third tube 131 similarly discharges the filtrates from the second stage 120 towards the third stage 130. Finally, a fourth tube 141 emerges from the vessel of the last stage 130 and sheds the filtrates, which are liquid at this stage, into a reservoir or into the initial environment (harbor, lake, pond etc.).

Whatever the embodiment, each of the stages therefore has a similar structure forming a centrifuge system. Only the size of the meshes of the sieving basket varies so that the filtering of the sediments may be gradually made finer as and when the stages are passed. Thus, in the embodiment described, the first sieving stage 110 holds back the large particles with a size of over 5 mm, the second stage 120 filters the residues of average size between 1 mm and 5 mm and a third stage 130 processes the small particles of sizes smaller than 1 mm.

Whenever a stage is passed, the residues can be ejected towards the corresponding storage vat 112, 122, 132 and recovered to be recycled. By way of an example, the large-sized wastes (pebbles, gravel etc.) can be used for the base layers in roads, medium-sized wastes (sand) can be collected in large sized bags and the fine-sized wastes can be recycled in agronomy.

5.4 Description of Operation

The operation of the device described with reference to FIGS. 9 to 15.

A device 100 such as this for sieving sediments can rest on the floor or be installed on a barge on the surface of a liquid environment (harbor, pond, lake etc.), this latter configuration enabling the sediments not to pass through the "waste" stage.

The sediments, which are of powdery type, recovered during a dredging operation, are for example automatically shed into the first sieving basket 300 of the first stage 110.

As illustrated in FIG. 15, the method of the invention, for each sieving stage, implements successive sieving cycles. A sieving cycle comprises several phases, or steps, once the sieve of the first stage has received (step 810) a dose of sediment to be processed.

During a first phase 820 of a duration appropriate to the desired level of drying, the electrical motor M is actuated, driving the shaft 400 in rotation, this shaft being fixedly attached to the basket 300. The putting of the basket into rotation, as in a centrifuge, increases the gravitational field about the sediments: these sediments get placed flat against the perforated surface of the basket and water and the particles smaller than the size of the holes are projected through the basket 300 and go into the container 500 and then to the overflow nozzle tip 530, preferably placed above a second sieving basket of the next sieving stage in order to undergo a second processing, the second sieving basket comprising smaller-sized meshes.

In a second phase 830, the rotation speed of the basket 300 is then increased so as to project the residues that have not passed through the holes along tilted walls of the basket and towards the ejection rim 310 at the top of the basket. The residues, because of the speed acquired during the rotation of the basket, are ejected into a vessel 600 and go into the discharge funnel 620 in order to be transferred and, as the case may be, stored in storage vats.

A third phase 840 for the rotation of the basket 300, which is a slower rotation, is accompanied by the starting up of the nozzles 710 for projecting fluid under pressure. The fluid is thus projected throughout the height of the basket 300 and, because of its rotation, throughout its periphery. The pressure exerted unclogs the holes of the basket 300 and pushes the particles obstructing the filter towards the center of the basket. Thus, the subsequent sieving operations do not lose in efficiency.

Finally, during a fourth phase 850, the feeding of the projection nozzles 710 is cut off and then the motor M is stopped, the rotation of the basket being thus stopped. Another overflow of sediments into the basket 300 can also be envisaged, with the basket working at a slower rotation speed in order not to completely stop the motor M.

The cleansing fluid that flows into the container 500 drives the remaining sedimentary particles filtered towards the overflow nozzle tip 530 and then towards the second sieving stage 120.

At each sieving stage, the same phases that constitute a sieving cycle take place again. All the sieving stages can work at the same time. Only the filling of the highest basket is automatically done before each rotation. Besides, the rotating of the baskets, the rotation speed of the baskets and the distribution of cleansing fluid are advantageously automated so as to make the operations of processing the sediment more fluid and efficient.

When the three sieving stages 110, 120, 130 have been crossed, the final filtrates are appreciably liquid and can be sent back into the environment from which the sediments where taken or transferred to a processing zone if polluted.

The invention claimed is:

1. System for removing sediments from a bed of a liquid environment such as a harbor or a pond comprising:
    a mobile suction mouth at a lower extremity of a conduit, an upper extremity of which leads into open air;
    a motor-driven arrangement for controlling the vertical position of the suction mouth configured to provide two positions for said suction mouth, namely,
        a discharging position where said mouth rests on said bed to define a cleansing perimeter; and
        a raised position where the mouth is raised so that it is not in contact with the bed, allowing moving said suction mouth to another area to be cleansed;
    at least one of a water jet under pressure directed towards the bed and a mechanical stirring device for carrying out a local stirring operation within said suction mouth; and
    a pump for discharging sediments confined to the interior of said suction mouth without being put into contact with an external aquatic environment by passing the sediments through a discharge channel connecting said mouth to the surface of said liquid environment, and allowing the sediments to circulate, said pump being activated when the suction mouth is in the discharging position, generating a local depression, the suction mouth being in contact with the bed and the conduit being under atmospheric pressure, said pump being stopped when the suction mouth is in the raised position.

2. System for removing according to claim 1 further comprising a floating unit supporting a first extremity of said discharge channel.

3. System for removing according to claim 1 further comprising a unit mobile on said bed, connected to said discharge channel through a second extremity.

4. System for removing according to claim 1 wherein said conduit carries and/or forms said discharge channel.

5. System for removing according to claim 1 further comprising at least one of a sensor and a sonar device for checking on the submerged height of said conduit.

6. System according to claim 3 wherein at least one of said floating unit and said unit mobile on the bed is equipped with a motor that provides independent movement.

7. System according to claim 1 further comprising at least one motor to control its movement of the system so that it gradually covers a pre-defined surface.

8. System according to claim 2 wherein the floating unit is guided along at least one guide cable, and at least one motor drives said floating unit along said cable or cables.

9. System according to claim 1 wherein the system is connected to at least one unit for receiving removed sediments.

10. Method for removing sediments from a bed of a liquid environment such as a harbor or a pond, the method comprising at least one iteration of the following steps:

moving a floating unit up to an area to be cleansed, supporting an upper extremity of a conduit;

descending a suction mouth provided at a lower extremity of said conduit until said suction mouth rests on said bed;

carrying out local stirring inside said mouth;

putting a pump into operation, creating a depression in the cleansing area, placing said mouth under atmospheric pressure without a mixture in the mouth being put into contact with an external aquatic environment;

discharging sediments from said mouth to the surface of said liquid environment;

stopping said stirring and said discharging; and raising said suction mouth.

11. Method according to claim 10 wherein said steps are reiterated, the steps of successive placing being controlled by a step for computing a new position of said mouth.

12. Method according to claim 11 wherein the step for locating position takes account of a pre-determined processing plan defining a surface to be gradually processed.

13. System for removing sediments from a bed of a liquid environment such as a harbor or a pond comprising:

a floating unit supporting an upper extremity of a conduit, motors driving the winding of cables anchored to anchoring points, to move the floating unit up to an area to be cleansed, a mobile suction mouth at a lower extremity of said conduit, a motor-driven arrangement for descending said suction mouth until it rests on the bed to be cleansed, defining a cleansing perimeter, a pump for discharging sediments confined in said suction mouth without being put into contact with an external aquatic environment, and a discharge channel connecting said mouth to the surface of said liquid environment and allowing sediments to circulate, said pump being activated when the suction mouth rests on the bed, generating a local depression, the suction mouth being in contact with the bed and the conduit being under atmospheric pressure.

14. System for removing sediments from a bed of a liquid environment such as a harbor or a pond comprising:

a floating unit supporting an upper extremity of a conduit, a mobile suction mouth at a lower extremity of said conduit, a motor-driven arrangement for descending said suction mouth until it rests on the bed to be cleansed, defining a cleansing perimeter, at least one of a water jet under pressure directed towards said bed and a mechanical stirring device for carrying out a local stirring operation within said suction mouth, a pump for discharging sediments confined in said suction mouth without being put into contact with an external aquatic environment by passing the sediments through a discharge channel connecting said mouth to the surface of said liquid environment and allowing sediments to circulate, said pump being activated when the suction mouth rests on the bed, so as to create a local depression, the suction mouth being in contact with the bed and the conduit being under atmospheric pressure.

* * * * *